United States Patent
Makay

[11] 3,895,980
[45] July 22, 1975

[54] COATED LEAD AZIDE COMPOSITIONS SENSITIVE TO FLAMES BUT INSENSITIVE TO FRICTION

[75] Inventor: Nicolas Makay, Rio de Janeiro, Brazil

[73] Assignee: F. G. Kretschmer & Co., Vaduz, Liechtenstein

[22] Filed: Nov. 7, 1973

[21] Appl. No.: 413,573

Related U.S. Application Data

[63] Continuation of Ser. No. 240,962, April 4, 1972, abandoned.

[30] Foreign Application Priority Data

Apr. 4, 1972 Germany............................ 2120916

[52] U.S. Cl..................... 149/8; 117/100 B; 149/26; 149/35
[51] Int. Cl............................................. C06c 1/02
[58] Field of Search........ 149/78, 35, 26; 117/100 B

[56] References Cited
UNITED STATES PATENTS

| | | | |
|---|---|---|---|
| 2,371,000 | 3/1945 | Snelling | 149/8 X |
| 3,291,664 | 12/1966 | Taylor et al. | 149/35 X |
| 3,361,602 | 1/1968 | Leslie | 149/26 X |
| 3,431,156 | 3/1969 | Kenney | 149/35 X |
| 3,577,515 | 5/1971 | Vandegaer | 117/100 B X |
| 3,634,155 | 1/1972 | Prior | 149/35 X |

*Primary Examiner*—Richard D. Lovering
*Assistant Examiner*—E. A. Miller
*Attorney, Agent, or Firm*—Stevens, Davis, Miller & Mosher

[57] ABSTRACT

Lead azide compositions of uniform particle size comprising lead azide coated uniformly with lead trinitrorescorcinate and possibly a solid lubricant. The compositions are prepared by introducing precursors into at least one reactor free of mechanical agitators and rotatable about a horizontally extending longitudinal axis. If more than one reactor is employed the reactors are connected in series. The reactors are heated to prevent explosive crystal formation.

6 Claims, 1 Drawing Figure

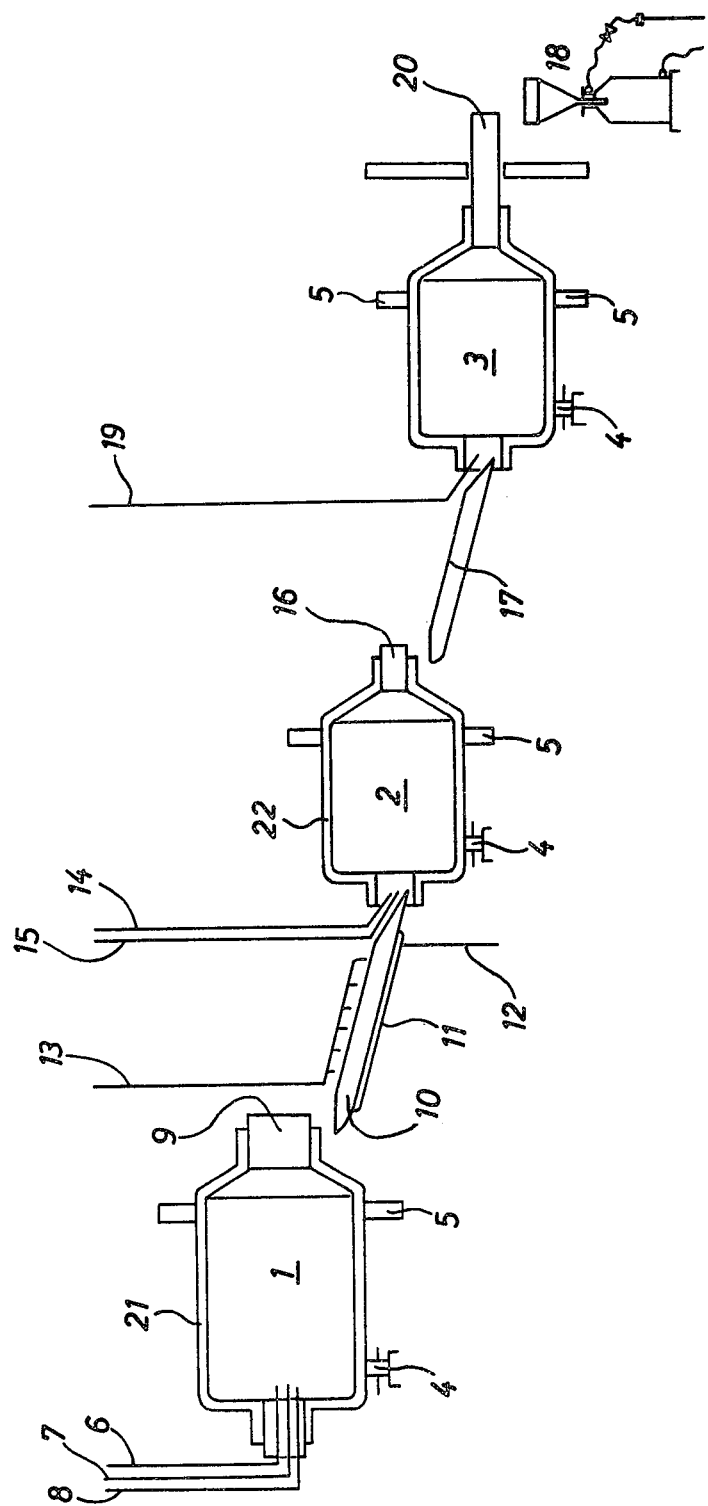

COATED LEAD AZIDE COMPOSITIONS SENSITIVE TO FLAMES BUT INSENSITIVE TO FRICTION

This is a continuation of application Ser. No. 240,962, filed Apr. 4, 1972, and now abandoned.

The present invention relates to lead azide compositions sensitive to flame but insensitive to friction and to a process and apparatus for the preparation thereof.

The most extensively used initiators or priming explosives are lead azide and lead trinitroresorcinate, which are prepared by the double decomposition of sodium azide and magnesium trinitroresorcinate, respectively, with a lead salt from aqueous solutions. Lead azide crystallizes in various forms, depending on the pH value of the agent, the temperature and the presence of various macromolecular compounds, such as dextrin, gelatin and/or polyvinyl alcohol.

Inasmuch as lead azide is an extremely sensitive explosive the dangers involved in its use need to be reduced to a minimum.

Hence, pure lead azide is never employed in practice, but only products which, in addition to lead azide contain other, sparingly soluble, lead salts, such as basic lead hydroxide and lead oxide, preferably in a quantity of about 5% of the weight of the lead azide.

Lead azide detonates at the comparatively high temperature of about 270°C., depending on the duration of the heating while lead trinitroresorcinate also called lead styphnate, detonates at a lower temperature.

Lead azide is usually prepared by a batch process in stainless steel reactors provided with mechanical agitators or by a continuous process employing glass columns. Both processes have drawbacks. In the batch process, a product having constant physical properties is difficult to obtain. In the continuous process, in which the double decomposition occurs in glass columns, the mixing possibilities are limited. The size and form of the product particles also are unsatisfactory.

To overcome the above described difficulties, the present invention is directed toward a continuous process, in which the inherent dangers are minimized. The process of the present invention also assures accurate batching of the reactants and constant double decomposition into a uniform product. In addition, a lead azide is prepared which is sensitive to flame but insensitive to friction.

An object of this invention is to provide lead azide compositions having constant physical properties.

A further object of this invention is to provide lead azide compositions of uniform particle size.

A further object of this invention is to provide lead azide compositions sensitive to flame but insensitive to friction.

A further object of this invention is to provide a new method for developing lead azide compositions having constant physical properties.

A further object of this invention is to provide an apparatus for preparing lead azide compositions of uniform particle size.

A further object of this invention is to provide an apparatus for accurate batching of the reactants utilized in the preparation of lead azide compositions.

These goals are achieved by the present invention which comprises introducing precursors of the product desired into at least one of three stages each comprising substantially cylindrical reactors, rotatable about substantially horizontally extending longitudinal axes. The reactors are connected in series when more than one reactor is employed. One reactor is employed to produce one product. Two reactors are employed to produce a second but different product. Three reactors are employed to produce a third but still different product.

In the first stage reactor there is introduced an aqueous solution of at least one soluble azide, an aqueous solution of at least one lead salt and an aqueous solution of at least one protective colloid. The precipitated lead azide is withdrawn from the first reactor and processed in a conventional manner if one type of product is desired or, if necessary, after filtering and washing with water, transferred into an aqueous suspension in the second reaction. Separately delivered in the second reactor are an aqueous solution of at least one trinitroresorcin salt and an aqueous solution of at least one lead salt. The suspension of lead azide coated with lead trinitroresorcinate thus obtained is withdrawn from the second reactor and processed either in a conventional manner or introduced into the third reactor. If introduced into the third reactor a solid lubricant is added to said suspension. The solid end product thus obtained is separated out in a conventional manner.

The process according to the present invention is performed without mechanical agitators so as to avoid crystallization on the agitators. Nevertheless, excellent mixing is obtained in the individual reactors. Their rotational speeds are more even than in mechanical or air-lift agitators. As will be explained below, the process of the present invention yields a product from each reactor having a grain size which is more uniform than in known processes.

In the second stage of the process in accordance with the invention, the more flame-sensitive lead styphnate is precipitated onto the lead azide particles. This has the advantage that it always lies on the surface of said particles and is thus in contact with the flame. In practice, this results in the important advantage that when lead azide in accordance with the invention is employed with lead styphnate precipitated thereupon, only about one-third the normal amount by weight of lead styphnate need be utilized for a primary load with the same effectiveness. By reason of the fact that the lead styphnate is always found on the surface of the lead azide particles, a smaller amount of lead styphnate produces the same effect as when lead azide is mixed by mechanical means, as has hitherto been the practice.

The lead azide obtained by the process according to the present invention has, with or without a lead styphnate coating or solid lubricant covering, a very uniform particle size. In practice this uniformity is extremely desirable and of tremendous advantage. The size of the lead azide agglomerate with or without lead styphnate coating or solid lubricant covering is usually on the order of 80 to 120 $\mu$.

The solid lubricant is applied to the surface of the lead azide/lead styphnate grains as a thin coating to reduce to a large degree the sensitivity to friction and static electricity.

The solid lubricant is preferably added in the form of a suspension, e.g., with castor oil. Zinc stearate, cadmium chloride, cobalt chloride or preferably molybdenum sulfide are suitable as solid lubricants.

In the first stage of the process according to the present invention, the water-soluble lead salts may be utilized in stochiometric proportion or in an excess of the stochiometric proportion. The excess may be sufficient for the formation of the lead trinitroresorcinate in the second stage.

When it is desirable to prepare a particularly effective end product, it has been found expedient and advantageous to filter and wash the lead azide precipitated in the first reactor prior to transferring it to the second reactor. This product may be employed as a priming explosive in unaltered form or processed further in the manner described.

It also is advisable to introduce the reaction solutions into the reactors at a temperature varying between 20° and 80°C. and to keep the solutions at these temperatures. To maintain the solution temperatures at an increased level, the reactors are suitably surrounded by a heating jacket through which a heating medium is circulated. The temperature of the medium is slightly higher, preferably 1° to 2°C., than the temperature of the liquid being fed into the reactor. By maintaining the temperature of the solutions at an increased level crystallization of material on the reactor walls is prevented. It also is possible to maintain the solution temperature by spraying the rotating reactors with a heating liquid of comparable temperature or to keep the reactors at the desired temperature through infrared heating. Finally, it also is possible to rotate the reactors in a heated bath. In this case it is necessary also to spray the reactor surface which is not immersed in the bath with a liquid having a temperature comparable to the heated bath.

Preferably, the first stage of the process according to the invention is performed at a temperature varying between 20° and 60°C., and most favorably at 55°C. The second stage of the process is preferably performed at a temperature between 40° and 80°, and most favorably at 75°C. The third stage normally requires no external heat.

The apparatus consists of two or three series-connected substantially cylindrical reactors rotatable about their substantially horizontally extending longitudinal axes which are disposed on various levels descending from the first to the second or to the third reactor and interconnected by pipes. In addition, they have separate pipes for the delivery of solutions of the various starting materials. Connected to the third reactor there is provided a conventional filtering device. For the sake of expediency, the individual cylindrical reactors are tilted, so that they can be washed out when the installation is not in operation.

According to a preferred embodiment of the present invention each cylindrical reactor of the apparatus is surrounded by a heating jacket. However, the reactor may likewise rotate within a heatable bath in a mixture of glycerol and water which, under certain circumstances, may also contain ammonium acetate to dissolve sensitive needle-like crystals of explosive material. Means are provided in this case to spray the surface of the reactors not immersed in the bath solution with a liquid of suitable temperature.

It has been found to be extremely advantageous to construct the connection between the first reactor and the second reactor disposed on a lower level with a sieve pipe, onto which the lead azide precipitated in the first reactor can be separated out on its way to the second reactor from the reaction liquid containing a protective colloid. Said reaction liquid drips downward through the holes of the sieve pipe and can be removed by a suitable collecting pipe. The lead azide on the sieve pipe is subsequently washed with water and flushed into the second reactor.

The inner walls of the reactors shall consist of materials which do not promote the crystallization of lead azide and lead styphnate. Suitable for this purpose are alkali-resisting glass and high-polymer plastics, e.g., polyvinyl chloride, polyethylene and polypropylene, as well as stainless steel.

To assure uniform concentrations, a comparatively large amount of a pre-heated aqueous solution of a protective colloid, such as dextrin, gelatin and/or polyvinyl alcohol, is fed into the rotating reactors by means of a rotameter. Likewise, by means of a rotameter all remaining solutions, for example the solutions of sodium azide, magnesium styphnate and the lead salts are fed thereinto. The rotameters are equipped with a photoelectric device for the accurate control of the batching. When materials precipitate from one or more solutions, the batching is stopped by the photoelectric device.

The inner walls of the reactors have vanes spaced apart which extend in the direction of the longitudinal axis. Said vanes assure the thorough mixing of the feed solutions or suspensions.

The vanes are necessary when reactors having a circular cross-section are employed. However, it is possible to dispense with the vanes, when the cross-section is polygonal, preferably hexagonal.

For the sake of expediency, the reactors are independently driven by means disposed thereunder. The drive can be effected via gears which are preferably plastic or rubber.

The present invention will now become more apparent by means of the following description when related to the accompanying drawing.

Reactors 1, 2 and 3 are series-connected substantially cylindrical reactors disposed on descending levels and rotatably mounted about their substantially horizontal longitudinal axes. The corresponding bearings have reference numerals 4 and 5.

Reactor 1 has three diagrammatically shown supply lines 6, 7 and 8, one for each of the three solutions fed into it, namely, for the solution having at least one water-soluble azide, for the solution having at least one water-soluble lead salt and for the solution having at least one protective colloid.

The lead azide precipitated in reactor 1 exits through outlet 9 thereof and reaches in this embodiment sieve pipe 10, on which the crystallized lead azide remains, while the reactor liquid from reactor 1 passes through the sieve holes and is withdrawn via collecting pipe 11 and outlet 12. The lead azide on sieve pipe 10 is washed with hot water of about 75°C. from water supply line 13 and flushed into reactor 2. Reactor 2 has two diagrammatically shown supply lines 14 and 15 for the two solutions to be fed thereinto, namely the solution of at least one water-soluble trinitroresorcin salt and the solution of at least one water-soluble lead salt. The lead azide coated with lead trinitroresorcinate in reactor 2 passes through outlet 16 thereof and enters reactor 3 via pipe 17. Pipe 19 supplies reactor 3 with a solid lubricant. The end product leaving reactor 3 at outlet 20 reaches a conventional filtering means 18, where it is processed in a conventional manner. If necessary, the end product may thereafter be delivered in a conventional manner to a drying means.

If it is not desired to free the lead azide obtained in reactor 1 from the reactor liquid employed therein, sieve pipe 10 may also be replaced by a normal pipe without sieve properties. If in this case an excess lead salt has been used in reactor 1, only a smaller amount of lead salt or no lead salt at all need be delivered to reactor 2, depending on the excess found in reactor 1.

The use of flow pipes to connect the individual reactors with one another represents an advantageous embodiment of the present invention. However, it is also possible to replace pipe 17 and a corresponding pipe having no sieve qualities for the connection of reactors 1 and 2 by a suitable rubber-tube connection.

In the embodiment shown in the drawing reactors 1 and 2 are each surrounded by a heating jacket 21 or 22, through which is circulated a suitable heating means through feed lines and draw lines (not shown). In reactor 1 the reaction liquid is kept at 55°C. by heating means circulated through the heating jacket, the temperature of the heating means itself being kept at a slightly higher temperature. In reactor 2, the reaction liquid is kept at 75°C., whereby the temperature of the heating means again is higher by a few degrees.

In reactor 3 no external heat need be supplied to the reaction mixture. If the lead azide having a uniform particle size and precipitated in reactor 1 represents the desired end product, a filtering means of known construction is connected to reactor 1 while reactors 2 and 3 with accessories are dispensed with. If the product obtained in reactor 2 is the desired product, a conventional filtering means is connected to reactor 2 and reactor 3 with accessories is dispensed with.

The present invention will be further illustrated by the following examples which are by no means limitative.

All of the examples illustrate the continuous process in three stages:

EXAMPLE 1

Through pipe 6,200 liters per hour of a 0.4% by weight aqueous solution of gelatin are introduced into reactor 1. Through pipe 7 into reactor 1 passes 20 liters per hour of a 40.0% by weight solution of lead nitrate. Into reactor 1 through pipe 8 are introduced 20 liters per hour of an aqueous solution containing 15.0% by weight of sodium azide, 0.06% by weight Rochelle salt and 0.12% by weight of sodium hydroxide.

The lead azide precipitated in the reactor 1 may either be employed as a priming explosive or transferred into reactor 2.

Through pipe 14 are fed 4 liters per hour of a 21.0% by weight aqueous solution of lead nitrate. Through pipe 15 flows 4 liters per hour of an 18.0% by weight aqueous solution of magnesium styphnate.

The suspension in reactor 2 may be processed in a conventional manner so as to employ the lead azide coated with lead styphnate as a priming explosive, or the suspension may be transferred to reactor 3 which is supplied, through pipe 19, with a flow of ingredients of 6 liters per hour of a 0.1% by weight aqueous suspension of aluminum stearate.

EXAMPLE 2

Through pipe 6,200 liters per hour of a 0.4% by weight aqueous solution of gelatin are introduced into reactor 1. Through pipe 7 into reactor 1 passes 20 liters per hour of a 40.0% by weight solution of lead nitrate. Into reactor 1 through pipe 8 are introduced 20 liters per hour of an aqueous solution containing 15.0% by weight of sodium azide, 0.06% by weight of Rochelle salt and 0.12% by weight of sodium hydroxide.

The lead azide precipitated in reaction 1 may be employed as a priming explosive or transferred into reactor 2. Through pipe 15 are fed 4 liters per hour of a 21.0% by weight aqueous solution of lead nitrate. Through pipe 15 flows 5 liters per hour of an 18.0% by weight aqueous solution of magnesium styphnate.

The suspension in reactor 2 may be processed in a conventional manner so as to employ the lead azide coated with lead styphnate as a priming explosive, or the suspension may be transferred to reactor 3, which is fed through pipe 19 with a flow of ingredients of 6 liters per hour of a 0.1% by weight aqueous suspension of molybdenum sulfide.

EXAMPLE 3

Into reactor 1 through pipe 6 are fed 200 liters per hour of a 0.8% by weight aqueous solution of gelatin. Through pipe 7 flows 20 liters per hour of a 40.0% by weight aqueous solution of lead nitrate. Through pipe 8 passes 20 liters per hour of an aqueous solution containing 15.0% by weight of sodium azide, 0.06% by weight of Rochelle salt and 0.12% by weight of sodium hydroxide.

The lead azide precipitated in reactor 1 may be employed as a priming explosive or transferred to reactor 2. Through pipe 14 are fed 15 liters per hour of a 6.0% by weight aqueous solution of lead nitrate and through pipe 15 are fed 14 liters per hour of a 5.0% by weight aqueous solution of sodium styphnate.

The suspension in reactor 2 may be processed in a conventional manner so as to employ the lead azide coated with lead styphnate as a priming explosive, or the suspension may be transferred to reactor 3, which is fed through the pipe 19 with a flow of ingredients of 6 liters per hour of a 1.0% by weight aqueous suspension of molybdenum sulfide.

The lead azide with lead trinitroresorcinate coating and solid lubricant covering in accordance with the present invention and prepared in accordance with Examples 1–3 is insensitive to static discharges. The product of Example 1 is insensitive to a charge of up to 20,000 Volts. The product of Example 2 is insensitive to a charge of up to 15,000 Volts. The product of Example 3 is insensitive to a charge of up to 30,000 Volts.

The product obtained in accordance with the present invention is extremely effective. For example, 60 mg of a product obtained according to Examples 1 to 3 with lead styphnate coating and solid lubricant covering compressed under a load of 180 kg/cm$^2$, initiate 1 g cyclonite compressed under a load of 380 kg/cm$^2$.

What is claimed is:

1. A lead azide composition comprising uniformly sized lead azide particles covered uniformly with lead trinitroresorcinate.

2. The lead azide composition of claim 1 covered uniformly with a solid lubricant.

3. A process for the preparation of flame-sensitive but friction-insensitive lead azide compositions comprising feeding an aqueous solution of at least one azide, an aqueous solution of at least one lead salt and an aqueous solution of at least one protective colloid into a substantially cylindrical reactor, rotatable about its substantially horizontally extending longitudinal axis, reacting said azide and lead salt, removing the precipitated lead azide from the reactor, feeding said precipitated lead azide after filtering and washing with water into a second substantially cylindrical reactor rotatable about its substantially horizontally extending longitudinal axis simultaneously with an aqueous solution of at least one trinitroresorcin salt and an aqueous solution of at least one lead salt, reacting said trinitroresorcin and lead salts, removing therefrom a suspension of lead azide coated with lead trinitroresorcinate, washing and drying the coated lead azide.

4. The process of claim 3 including feeding said suspension into a third substantially cylindrical reactor rotatable about its substantially horizontally extending axis simultaneously with a solid lubricant and separating out a lead azide product coated with lead trinitroresorcinate and covered by said solid lubricant.

5. A lead azide composition when prepared by the process of claim 3.

6. A lead azide composition when prepared by the process of claim 4.

* * * * *

UNITED STATES PATENT OFFICE
CERTIFICATE OF CORRECTION

PATENT NO. : 3,895,980
DATED : July 22, 1975
INVENTOR(S) : Nicolas Makay

It is certified that error appears in the above-identified patent and that said Letters Patent are hereby corrected as shown below:

[30] change "April 4, 1972" to -- April 28, 1971 --.

Column 2, line 15, cancel "reaction" and insert -- reactor --.

Column 5, lines 41 and 64, cancel "6,200" and insert
-- 6    200 --.

Signed and Sealed this fourth Day of November 1975

[SEAL]

Attest:

RUTH C. MASON
*Attesting Officer*

C. MARSHALL DANN
*Commissioner of Patents and Trademarks*